United States Patent [19]
Kay

[11] Patent Number: 6,069,313
[45] Date of Patent: May 30, 2000

[54] BATTERY OF PHOTOVOLTAIC CELLS AND PROCESS FOR MANUFACTURING SAME

[75] Inventor: Andreas Kay, Waldkirch, Germany

[73] Assignee: Ecole Polytechnique Federale de Lausanne, Switzerland

[21] Appl. No.: 09/066,323

[22] PCT Filed: Oct. 31, 1995

[86] PCT No.: PCT/IB95/00936

§ 371 Date: Jun. 5, 1998

§ 102(e) Date: Jun. 5, 1998

[87] PCT Pub. No.: WO97/16838

PCT Pub. Date: May 9, 1997

[51] Int. Cl.[7] .......................... H01L 27/142; H01L 21/02; H01M 10/36

[52] U.S. Cl. .......................... 136/249; 136/244; 136/251; 429/111; 438/62; 438/66; 438/80; 438/85; 438/97

[58] Field of Search .................... 136/244, 251, 136/249 MS; 429/111; 438/62, 66, 85, 97, 80

[56] References Cited

U.S. PATENT DOCUMENTS

| | | | |
|---|---|---|---|
| 4,097,655 | 6/1978 | Witzke | 429/111 |
| 4,754,544 | 7/1988 | Hanak | 438/66 |
| 4,968,354 | 11/1990 | Nishiura et al. | 136/244 |
| 5,273,911 | 12/1993 | Sasaki et al. | 438/62 |
| 5,350,644 | 9/1994 | Graetzel et al. | 429/111 |
| 5,593,901 | 1/1997 | Oswald et al. | 438/80 |

*Primary Examiner*—Bernard Codd
*Attorney, Agent, or Firm*—Clifford W. Browning; Woodard, Emhardt, Naughton Moriarty & McNett

[57] ABSTRACT

A plurality of series-connected elements are arranged, as parallel elongated stripes, on a common electrically insulating transparent substrate (1). Each element comprises a photoanode (4), a porous counterelectrode or cathode (6) and an intermediate electrically insulating porous layer (5) separating the photoanode (4) from the cathode (6). The pores of the intermediate layer (5), the photoanode (4) and the cathode (6) are at least partially filled with an electron transferring electrolyte. An intermediate layer (2) of a transparent electrically conducting material is interposed between the substrate (1) and each photoanode (4). The cathode (6) of the first photovoltaic element of the series is electrically connected with a first terminal (9) of the battery. The cathode (6) of each following element is connected with the intermediate conducting layer (2) of the preceding element, over a gap (3) separating the respective intermediate layers (2) of these two elements.

25 Claims, 1 Drawing Sheet

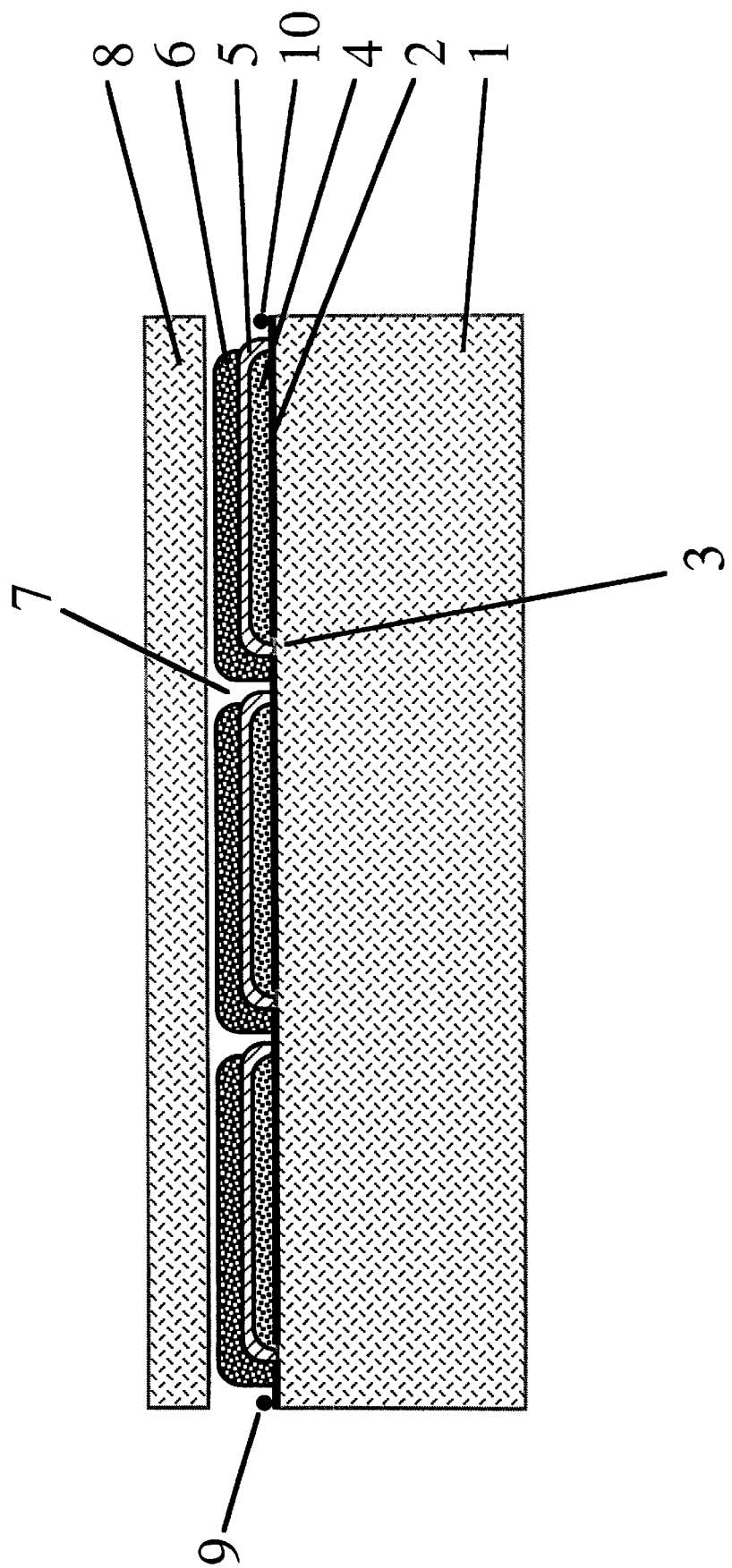

BATTERY OF PHOTOVOLTAIC CELLS AND PROCESS FOR MANUFACTURING SAME

This invention concerns monolithic, series-connected, dye-sensitized photovoltaic modules consisting of dye-sensitized nanoporous semiconductor layers as photoelectrodes on an electrically conducting, transparent substrate, an electron transferring redox electrolyte and counterelectrodes. Single photovoltaic cells of this type have already been described [Journal of the American Chemical Society, vol. 115 (1993) pp. 6382–6390]. Tin oxide coated glass as transparent, electrically conducting substrate is covered with a porous semiconductor layer of nanocrystalline titanium dioxide as photoelectrode and sensitized for visible light by adsorption of a dye. The dye is excited by absorption of light and injects an electron into the titanium dioxide. Through the conducting substrate the electrons reach the external circuit where they may carry out electrical work. The oxidized dye is reduced by the electron transferring electrolyte, which fills the pores of photoelectrode and the space up to the counterelectrode. The counterelectrode usually consists of tin oxide coated glass as well, which is catalytically activated with platinum in order to transfer the electrons arriving from the external circuit back to the electrolyte.

The fabrication of efficient large surface area cells was difficult up to now since the distance between photo- and counterelectrode soon becomes too large (>20 $\mu$m) due to the limited flatness of the separate substrates, causing additional ohmic losses and even diffusion limitations of the photocurrent in the electrolyte layer. Moreover the conductivity of the substrate is not sufficient to carry the high photocurrents produced by a large surface area cell. A possible solution would be the series-connection of many narrow stripes of cells to a module, by connecting the counterelectrode of one cell to the photoelectrode of the adjacent cell, as known from amorphous silicon cells [Solar Energy, vol 23 (1979) pp. 145–147]. However, with the present design of the dye-sensitized photovoltaic cell this would require conducting bridges reaching from one substrate through the electrolyte to the other substrate, while the distance between the substrates has to be kept very small (<20 $\mu$m). The corrosiveness of the electrolyte leaves little choice of suitable materials for these interconnecting bridges. Also the formation of lines of electrical contacts between the two separate substrates at temperatures which do not destroy the sensitizing dye is difficult to achieve.

In this invention we present a new design of the dye-sensitized solar cell, which allows to fabricate large surface area photovoltaic modules by series-connecting many photo- and counterelectrodes on the same substrate.

To this effect the present invention concerns a battery of photovoltaic cells as specified in claim 1. Particularly useful embodiments of the battery are specified in dependant claims 2 to 13. The invention also concerns a process for manufacturing the battery as specified in claim 14. Particularly useful execution forms of the process are specified in dependant claims 15 to 20.

The FIGURE shows a schematical cross-section of an embodiment of the battery.

The nanoporous photoelectrodes 4 are applied on a transparent conducting substrate 1, as in the original version of the dye-sensitized solar cell [Journal of the American Chemical Society, vol. 115 (1993) pp. 6382–6390], each on a predetermined area of the conducting coating 2. These areas form parallel strips of the required width for each solar cell separated by narrow insulating lines 3, where the conducting coating 2 of the substrate 1 has been removed. The photoelectrodes 4 are applied in such a way that each extends slightly over one edge of the corresponding conducting coating 2, while leaving bare the opposite edge. The photoelectrodes 4 are then covered with a porous layer of an electrical insulator 5. This layer is required to prevent short-circuiting in cases where the material of the counterelectrodes 6 would form ohmic contact with the photoelectrodes 4. The insulating layers 5 may at the same time act as a diffuse reflector that reflects light which has not yet been absorbed back into the photoelectrodes 4.

Porous counterelectrodes 6 of any convenient electronically conducting material are now applied over the bare edge of each conducting strip 2 and the adjacent photoelectrode 4, thereby connecting the solar cells in series. The gaps 7 between the counterelectrodes 6 may be filled with a nonporous insulator to prevent electrical shunting through the electrolyte. The coatings 4 to 6 may be heat treated at any stage in order to remove undesired additives and make good electrical contacts by sintering.

The sensitizing dye is then adsorbed through the porous counterelectrodes 6 and insulating layers 5 onto the nanoporous photoelectrodes 4. Finally the pores of layers 4 to 6 are filled with the electrolyte. The solar cell module is sealed by a top-cover 8, to prevent evaporation of the electrolyte and intrusion of humidity or oxygen. The top-cover 8 may at the same time serve to fill the gaps 7 between the counterelectrodes 6. Contacts are made at the first counterelectrode 9 and the last photoelectrode 10 of the series-connection.

This new design of the dye-sensitized solar cell has the following advantages:

1. Only a single transparent conducting substrate 1 is required, which reduces significantly the materials costs of the solar cell.
2. Both photoelectrodes 4 and counterelectrodes 6 are deposited on top of one another on the same substrate. Their separation is thus minimized independent of the flatness of the substrate.
3. The insulating layers 5 act as diffuse reflectors immediately on top of the photoelectrodes 4, and thus improve the efficiency of the solar cell.
4. The electrolyte is fixed by capillary forces in the porous matrix of coatings 4 to 6 and does not constitute an additional, free flowing layer.
5. The counterelectrodes 6 have an enlarged surface area due to their porosity, resulting in a higher catalytic efficiency for electron exchange with the electrolyte.
6. The series-connection of many solar cells on a single substrate in "Z"-configuration is achieved, as in the case of amorphous silicon cells [Solar Energy, vol 23 (1979) pp. 145–147], by simple overlap of the counterelectrodes 6 with the back contacts 2 of the adjacent photoelectrodes 4.
7. The pattern of the layers 4 to 6 may be produced on a large scale by common printing techniques, such as gravure printing or screen printing. The layers 4 to 6 may also be deposited over the whole surface first and be patterned subsequently, e.g. by mechanical, airjet, waterjet or laser scribing.
8. The layers 4 to 6 may be produced in a continuous process immediately following fabrication of the glass substrate 1 and coating with the transparent conducting layer 2 by successive deposition, patterning and heat treatment of the layers 4 to 6 on the substrate 1, which is transported continuously in the sense of the lines 3 through the different production stages.

9. The porosity of the insulating layers 5 and the counterelectrodes 6 allows application of the heat and humidity sensitive dye and electrolyte after fabrication of the layers 4 to 6 and formation of the electrical interconnections.

10. The top-cover 8 only serves to seal and insulate the cell but has not any electrical conductor function.

EXAMPLE

The transparent conducting layer 2 (e.g. fluorine doped tin oxide, tin doped indium oxide) on the insulating substrate 1 (e.g. glass, plastic) is scratched, etched or laser scribed in parallel lines 3 of the required separation (about 1 cm) in order to remove the conducting coating 2, thereby defining the area of each cell.

A dispersion of nanocrystalline semiconductor powder (e.g. titanium dioxide) is applied (e.g. by gravure printing or screen printing through a mask of appropriate geometry) to deposit the photoelectrodes 4 (ca. 10 $\mu$m thick), each extending slightly over one edge of the corresponding conducting coating 2, while leaving bare the opposite edge. The photoelectrodes 4 may also be deposited over the whole surface first, e.g. by doctor blading, printing or spraying, and separated into parallel stripes subsequently, e.g. by mechanical, airjet, waterjet or laser scribing. This patterning may also be carried out after deposition of the insulating layers 5, by removing simultaneously the layers 4 and 5 at the required places.

A dispersion of an insulator powder (e.g. glass or ceramics, such as aluminum oxide, silicon dioxide, titanium dioxide, zirconium dioxide) is now applied over the photoelectrodes 4 to create the porous insulating layers 5 (about 10 $\mu$m thick). In order to reflect light that has not been absorbed by the photoelectrodes 4 back into the same and thus enhance the efficiency of the solar cell the insulating layers 5 should contain particles of high refractive index (e.g. the rutile modification of titanium dioxide) and the appropriate size for strong light scattering (about 0,3 $\mu$m diameter in case of rutile). The addition of a binder that sinters at the temperature of heat treatment (below 550° C.) may be required for the formation of well coherent and adherent layers 5. In case of poorly insulating light scattering particles, such as rutile, the binder may at the same time serve as insulator between the particles.

For example the layers 5 may be obtained from a dispersion of rutile powder with a mean particle size around 0.3 $\mu$m and about 10% of its weight nanocrystalline zirconium dioxide powder with a particle size below 20 nm, which sinters on heat treatment below 550° C. and forms a well insulating binder between the rutile particles. Alternatively the rutile particles may be coated with a thin (several nanometer thick) film of an insulator (a low melting glass, silicon dioxide, aluminum dioxide, boron oxide, zirconium dioxide or a combination of these), which sinters on heat treatment below 550° C.

The patterning of the insulating layers 5 may be achieved as described for the photoelectrodes 4 by techniques such as gravure printing or screen printing, or by mechanical, airjet, waterjet or laser scribing.

A dispersion of a metal powder (e.g. a platinum group metal, titanium, tungsten, molybdenum, chromium), graphite powder, carbon black, a conducting ceramic powder (e.g. fluorine doped tin oxide or tin doped indium oxide), optionally with a catalytic deposit of a platinum group metal, or a conducting polymer (e.g. polyaniline, polypyrrole, polythiophene) is applied for the counterelectrodes 6 (up to several 10 $\mu$m thick, depending on the required conductivity).

Graphite powder has proven a good choice, because it combines sufficient conductivity and heat resistance as well as corrosion resistance and electrocatalytic activity with respect to the redox electrolyte. Graphite powder consists of platelike crystals which, on deposition from a liquid dispersion and drying, will preferentially align in the plane of the counterelectrodes 6, resulting in a high conductivity in this plane.

The catalytic activity of the counterelectrodes 6 for reduction of the redox electrolyte as well as their conductivity may be considerably enhanced by adding about 20% of carbon black to the dispersion of graphite powder. The enhanced catalytic activity is due to the very high surface area of carbon black, while the improved conductivity results from the partial filling of large pores between the graphite flakes with smaller carbon black aggregates.

Again a binder is required for good cohesion and adhesion of the counterelectrodes 6. Thus, nanocrystalline titanium dioxide with a particle size below 20 nm added to the dispersion at a weight of 15% of the graphite powder sinters on heating below 550° C. and yields well adherent, scratch resistant counter electrodes 6 with a sheet resistance of less than 10 Ohms for a thickness of 30 $\mu$m.

As described for the photoelectrodes 4 patterning of the counterelectrodes 6 may be achieved by techniques such as gravure printing or screen printing through an appropriate mask or by mechanical, airjet, waterjet or laser scribing.

The gaps 7 may be filled with a nonporous insulator (e.g. silicone rubber, a low melting glass frit or an organic polymer) to insulate adjacent counterelectrodes 6 from each other. Such an insulation is not necessary if just the pores of the coatings 4 to 6 are filled with electrolyte by capillary action later, such that the gaps 7 remain filled with air, nitrogen or another gas. If necessary the coatings 4 to 6 are heat treated at any stage to remove solvents and other undesired additives and to improve their mechanical strength and electrical properties by sintering.

The coated substrate 1 is dipped into a dye solution to sensitize the photoelectrodes 4. After drying electrolyte is admitted in order to fill the pores of layers 4 to 6 by capillary action. The module is encapsulated with a top-cover 8 (e.g. glass, organic polymer, anodized aluminum, lacquer or any other insulator). The top-cover 8 may also, if necessary, serve to fill the gaps 7 between the counterelectrodes 6. Electrical contacts are made at the first counterelectrode 9 and the last photoelectrode 10 of the series-connected module.

What is claimed is:

1. A battery of photovoltaic cells, characterized in that it consists of a monolithic assembly of a plurality of series-connected photovoltaic elements arranged as parallel elongated stripes on a common electrically insulating transparent substrate (1), each said element comprising a dye-sensitized photoanode made of a porous layer (4) of a polycrystalline semiconductor, a counterelectrode made of a porous layer (6) of an electrically conducting material, separated from said photoanode by an intermediate porous layer (5) of an electrically insulating material, wherein the pores of said layers (4,5,6) are at least partially filled with an electron transferring electrolyte, and an intermediate layer (2) of a transparent electrically conducting material interposed between the substrate (1) and the layer (4) constituting the photoanode of each said element, the respective electrically conducting intermediate layers (2) of two adjacent elements being separated from each other by a continuous elongated gap (3) and the layer (6) constituting the counterelectode of the first element of the series being electrically connected with a first terminal (9) of the battery while the layers (6) of the counterelectrodes of the other elements are electrically connected, over said gap (3) with the intermediate electrically conducting layer (2) of an adjacent element while being electrically insulated from each other and the electrically conducting intermediate layer (2) of the last element of the series being electrically connected with a second terminal (10) of the battery, and said assembly being covered with an electrically insulating liquid-tight top-cover (8).

2. A battery according to claim 1, characterized in that said intermediate porous layer of electrically insulating material is made of a glass powder or ceramic powder.

3. A battery according to claim 2, characterized in that said electrically insulating material comprises at least one of the following metal oxides: aluminium oxide, silicon dioxide, titanium dioxide, and zirconium dioxide.

4. A battery according to claim 3, characterized in that said metal oxide is titanium dioxide, as rutile, with a particle size of the order of 0.3 micrometers.

5. A battery according to claim 4, wherein said intermediate porous layer is further made of a minor amount by weight of nanocrystalline zirconium dioxide powder with a particle size below 20 nm, dispersed with said rutile powder.

6. A battery according to claim 2, characterized in that said intermediate porous layer is at least partially made of particles of said electrically insulating material, appropriate for reflecting light back into said layer constituting the photoanode.

7. A battery according to claim 6, characterized in that said intermediate porous layer is made of a mixture of a major amount by weight of said particles of said material appropriate for reflecting light back into said layer constituting the photoanode with a minor amount by weight of particles of an electrically insulating material having the property of sintering at a temperature below 550° C.

8. A battery according to claim 7, characterized in that said material in the form of particles having the property of sintering below 550° C. is selected from a glass, silicon dioxide, aluminum dioxide, boron dioxide, zirconium dioxide or a combination thereof.

9. A battery according to claim 6, characterized in that at least some of the particles of said material appropriate for reflecting light back into said layer constituting the photoanode are coated with a film of an electrically insulating material sintering at a temperature below 550° C.

10. A battery according to claim 9, characterized in that said material appropriate for reflecting light back into said layer constituting the photoanode is titanium dioxide, as rutile, with a particle size of the order of 0.3 micrometers and in that said electrically insulating material in the form of a film is selected from a glass, silicon dioxide, aluminum dioxide, boron dioxide, zirconium dioxide or a combination thereof.

11. A battery according to claim 6, wherein said particles appropriate for reflecting light back into layer constituting the photoanode are light scattering particles.

12. A battery according to claim 1, characterized in that said porous layer (6) of electrically conducting material is made from a material selected from at least one metal powder, at least one electrically conducting ceramic powder, powdered graphite, powdered carbon black, at least one electrically conducting organic polymer, and mixtures thereof.

13. A battery according to claim 12, characterized in that said porous layer (6) of electrically conducting material is made of a mixture of powdered graphite, carbon black and at least one binder material in the form of particles having a size appropriate for imparting them the property of sintering at a temperature below 550° C.

14. A battery according to claim 13, characterized in that said binder material is titanium dioxide with a particle size of less than 20 nanometers.

15. A battery according to claim 14, characterized in that said porous layer (6) is made of about 65% by weight graphite powder, 20% by weight carbon black and 15% by weight titanium dioxide.

16. A battery according to claim 12, characterized in that said metal is selected from a platinum group metal, titanium, tungsten, molybdenum and chromium, said electrically conducting ceramic material is selected from tin oxide doped with fluorine or antimony, indium oxide doped with tin and said electrically conducting organic polymer is selected from polyaniline, polypyrrole or polythiphene.

17. A battery according to claim 12, wherein a catalytic deposit of a platinum group metal covers at least the electrochemically active surface of said porous layer constituting the counterelectrode.

18. A process for manufacturing a battery of photovoltaic cells according to claim 1, characterized in that it comprises the following steps:

a) forming, on the surface of an electrically insulating transparent substrate (1), a plurality of parallel stripes 92) of a transparent electrically conducting material, said stripes (2) being separated from each other by a continuous elongated gap (3) of bare surface of substrate (1);

b) covering each of said stripes (2) with a porous layer (4) of a polycrystalline semiconductor;

c) covering said porous layer (4) with a porous layer (5) of an insulating material, the three above-indicated steps a), b), and c) being carried out so that the said porous layers (4) and (5) cover the exposed area of surface of said substrate (1) in the elongated gap (3) along one edge of said stripe (2) of electrically conducting material while leaving bare at least a portion of the surface of said stripe (2) along the opposite edge thereof;

d) covering said porous layer (5) of insulating material with a porous layer (6) of electrically conducting material, so that said latter layer (6) overlaps said former layer (5) over the portion thereof covering said gap (3) and contacts the bare portion of the surface of the adjacent stripe (2) of electrically conducting material while leaving a gap (7) on the opposite edge thus forming an assembly of a plurality of series-connected elements;

e) contacting said assembly with a liquid solution of a dye-sensitizer, so that this solution is introduced into the porous layer (4) of semiconductor of each element, through the porous layer (6) of electrically conducting material and the porous layer (5) of electrically insulating material;

f) evaporating the solvent of said solution of dye-sensitizer, leaving the dye absorbed on the layer (4) of semiconductor;

g) contacting the assembly with a liquid electrolyte, so that this electrolyte fills the pores of said porous layers (6, 5 and 4); and h) forming electrical first and second connections (9, 10) to the battery terminals, said first connection (9) being electrically connected with the porous layer (6) of conducting material of the first element of the battery and said second connection (10) being electrically connected with the stripe (2) of electrically conducting material of the last element, and covering the thus obtained assembly with an electrically insulating liquid-tight top-cover (8).

19. A process according to claim 18, characterized in that steps e), f), and g) are combined together by using a solution of a dye-sensitizer in a liquid electrolyte.

20. A process according to claim 18, characterized in that it further comprises the step of:
   i) electrically insulating from one another the porous layers (6) of electrically conducting material of all the elements by filling the gaps (7) separating these layers (6) with a liquid-tight insulating material, said step i) being optionally combined with the final operation of step h).

21. A process according to claim 18, characterized in that the step g) of contacting the assembly with a liquid electrolyte is carried out in such a manner that the inner cavities of the porous layers (4, 5, 6) are filled with electrolyte by capillarity, and in that an insulating gas, such as air or nitrogen, is left in the gaps (7) separating the porous layers (6) constituting the counterelectrode.

22. A process according to claim 18, characterized in that the steps b), c), and d) are carried out by suitable printing techniques in order to deposit the porous layers (4, 5, and 6) of semiconductor, insulating material and electrically conducting material, respectively, in the required pattern of parallel stripes on the substrate (1).

23. A process according to claim 22, characterized in that the elongated gaps (3) and the porous layers (4, 5, 6) are fabricated in a continuous process by successive patterning of the layer (2) of transparent electrically conducting material and deposition, patterning and heat treatment of the layer (4) constituting the photoanodes, the layer (5) of insulating material and the layer (6) of electrically conducting material, on the substrate (1) while continuously transporting the latter along the length of the elongated gaps (3), through a plurality of working stations.

24. A process according to claim 18, characterized in that the steps a), b), c), and d) are carried out by first applying a layer (2) of transparent electrically conducting material onto the whole surface of the substrate (1), then removing this layer (2) at the appropriate places to form the gaps (3), then applying the porous layers (4 and 5) of semiconductor and insulating material over the whole surface of the such coated substrate (1), then removing these layers (4 and 5) at the appropriate places to expose one edge of each stripe (2) of transparent electrically conducting material, then applying a layer (6) of porous electrically conducting material onto the whole surface of the such coated substrate (1), then removing this layer (6), optionally together with the underlying porous layers (4 and 5), at the appropriate places to form the gaps (7).

25. A process according to claim 24, characterized in that the elongated gaps (3) and the porous layers (4, 5, 6) are fabricated in a continuous process by successive patterning of the layer (2) of transparent electrically conducting material and deposition, patterning and heat treatment of the layer (4) constituting the photoanodes, the layer (5) of insulating material and the layer (6) of electrically conducting material, on the substrate (1) while continuously transporting the latter along the length of the elongated gaps (3), through a plurality of working stations.

* * * * *

UNITED STATES PATENT AND TRADEMARK OFFICE
CERTIFICATE OF CORRECTION

PATENT NO. : 6,069,313
DATED : May 30, 2000
INVENTOR(S) : Andreas Kay

It is certified that error appears in the above-identified patent and that said Letters Patent is hereby corrected as shown below:

Column 1,
Lines 52-58, please delete the paragraph.

Column 6,
Line 27, please change "92)" to -- (2) --.

Signed and Sealed this

Thirty-first Day of July, 2001

*Attest:*

*Nicholas P. Godici*

*Attesting Officer*

NICHOLAS P. GODICI
*Acting Director of the United States Patent and Trademark Office*